US012540473B2

(12) United States Patent
Yin et al.

(10) Patent No.: US 12,540,473 B2
(45) Date of Patent: Feb. 3, 2026

(54) PRECAST COLUMN AND METHOD OF MANUFACTURING THE SAME

(71) Applicant: RUENTEX ENGINEERING & CONSTRUCTION CO., LTD., Taipei (TW)

(72) Inventors: Samuel Yin, Taipei (TW); Jui-Chen Wang, Taipei (TW); Jhih-Syuan Chen, Taipei (TW)

(73) Assignee: RUENTEX ENGINEERING & CONSTRUCTION CO., LTD., Taipei (TW)

( * ) Notice: Subject to any disclaimer, the term of this patent is extended or adjusted under 35 U.S.C. 154(b) by 207 days.

(21) Appl. No.: 18/223,710

(22) Filed: Jul. 19, 2023

(65) Prior Publication Data

US 2024/0093492 A1 Mar. 21, 2024

(30) Foreign Application Priority Data

Sep. 20, 2022 (TW) ................................. 111135586

(51) Int. Cl.
*E04C 3/34* (2006.01)
*B28B 21/04* (2006.01)

(52) U.S. Cl.
CPC ................ *E04C 3/34* (2013.01); *B28B 21/04* (2013.01)

(58) Field of Classification Search
CPC ........ E04C 3/34; E04C 5/0618; E04C 5/0609; E04B 1/30; E04B 1/215; E04B 1/21
See application file for complete search history.

(56) References Cited

U.S. PATENT DOCUMENTS 3,127,702 A * 4/1964 Karstedt ................... E04C 3/34 52/367
3,213,581 A * 10/1965 Macchi ..................... E04B 5/32 52/577
4,467,583 A * 8/1984 Hasak ................... B21F 27/122 52/649.4
5,218,805 A * 6/1993 Rex ......................... E02D 27/42 52/295
6,244,014 B1 * 6/2001 Barmakian ....... B29C 45/14549 52/834
7,493,735 B2 * 2/2009 Yin ........................... E04C 3/34 140/92.5
7,850,399 B2 * 12/2010 Render ..................... E02D 5/30 405/251
9,677,274 B2 * 6/2017 Saiidi ........................ E04C 3/34

(Continued)

*Primary Examiner* — Brian E Glessner
*Assistant Examiner* — Daniel J Kenny
(74) *Attorney, Agent, or Firm* — Juan Carlos A. Marquez; Marquez IP Law Office, PLLC

(57) ABSTRACT

The present disclosure provides a precast column and a method for manufacturing the same, in which the precast column includes a base, a main structure, multiple main reinforcing bars and a concrete structure. The base includes multiple couplers disposed on a bottom mold and multiple stirrups surrounding the multiple couplers. One side of the main structure is connected to the base, and the main structure includes a hollow tube disposed inside the main structure. The multiple main reinforcing bars pass through the main structure, one end of each of which is connected to the corresponding one of the multiple couplers. The concrete structure covers the base, the main structure and the multiple main reinforcing bars.

7 Claims, 16 Drawing Sheets

(56) References Cited

U.S. PATENT DOCUMENTS

| | | | | |
|---|---|---|---|---|
| 10,323,402 | B1 * | 6/2019 | Yin | E04B 1/2403 |
| 10,344,468 | B2 * | 7/2019 | Yin | E04C 3/34 |
| 10,378,199 | B2 * | 8/2019 | Calderon Uriszar-Aldaca | E04B 1/388 |
| 10,837,173 | B2 * | 11/2020 | Yin | E04B 1/04 |
| 12,110,683 | B2 * | 10/2024 | Lim | E04B 5/328 |
| 2012/0124937 | A1 * | 5/2012 | Teng | E04B 5/43 52/834 |
| 2017/0051495 | A1 * | 2/2017 | Zavitz | E04C 5/12 |

* cited by examiner

PRECAST COLUMN AND METHOD OF MANUFACTURING THE SAME

CROSS-REFERENCE

This application claims priority to Taiwan application No. 111135586 filed on Sep. 20, 2022, which is incorporated herein by reference in its entirety.

TECHNICAL FIELD

The present disclosure relates to a precasting structure and a method for manufacturing the same, and more particularly to a precast column and a method for manufacturing the same.

BACKGROUND

Traditional on-site construction methods for reinforced concrete (RC) buildings require each floor of concrete to reach a predetermined strength before constructing another floor (e.g., an upper floor), which is time-consuming. Moreover, with such traditional methods, a large number of workers are required to tie up stirrups, assemble molds, and pour concrete on the construction site, which makes it difficult to control the construction quality. For example, workers' skills and weather conditions, which are difficult to manage, greatly impact the construction quality. In contrast, the construction method for steel-reinforced concrete (SRC) buildings can significantly reduce construction time. However, utilizing SRC for all structural beams and columns would result in a substantial consumption of steel and subsequently raise construction costs. To solve these problems, precast construction methods have emerged.

A precast construction method refers to a method of producing a concrete structure in a factory by pouring concrete into reusable molds, allowing it to solidify and harden in a controlled environment, and transporting it to the construction site for installation. This kind of factory production has several advantages, including environmental stability, immunity to weather considerations, reduced reliance on skilled labors, and standardized operating procedures. On the construction site, mechanical equipment can be used to assemble and lift the precast structures without requiring external scaffolding for workers to work on. Using precast construction methods, installation of a building's exterior walls and interior decorations can be carried out simultaneously, effectively shortening the construction time. As traditional wooden molds are not needed on the construction site, precast construction methods help to preserve forest resources, are environmentally friendly, and keep the construction sites neat and clean. Precast construction methods are suitable for building structures that need to bear heavy loads, such as precast columns or precast beams.

For heavy precast constructions, such as precast columns, construction workers need to operate tower cranes or hoist cranes to place the precast columns in their designated positions. However, when dealing with large-sized precast columns, the cost and difficulty of hoisting them increase significantly.

Thus, to solve the aforementioned problems, it is desirable for the construction industry to provide a lighter-weight precast column and a method of manufacturing the same.

SUMMARY

An embodiment of the present disclosure provides a method of manufacturing a precast column. The method includes providing a bottom mold; providing a base and disposing the base on a side of the bottom mold, the base including: multiple couplers disposed on the bottom mold and multiple stirrups surrounding the multiple couplers; providing a main spiral reinforcement and multiple ancillary spiral reinforcements, the multiple ancillary spiral reinforcements being disposed around and partially overlapping with the main spiral reinforcement; connecting one end of the main spiral reinforcement and one end of each of the multiple ancillary spiral reinforcements to the base; providing a hollow tube and disposing the hollow tube in the main spiral reinforcement, one end of the hollow tube being connected to the base, so that the hollow tube, the main spiral reinforcement and the ancillary reinforcements together form a main structure; providing a top mold and disposing the top mold on one side of the main structure that is away from the base; providing multiple main reinforcing bars and passing the multiple main reinforcing bars through the main structure so that each of the multiple main reinforcing bars is connected to the corresponding one of the multiple couplers; providing a pair of side molds and disposing the pair of side molds on two opposing sides of the main structure and those of the base, and connecting the two opposing ends of the pair of side molds to the bottom mold and the top mold, respectively; and pouring concrete into the space formed by the bottom mold, the top mold and the pair of side molds.

An embodiment of the present disclosure also provides a precast column, including: a base, a main structure, multiple main reinforcing bars and a concrete structure. The base includes multiple couplers disposed on a bottom mold and multiple stirrups surrounding the multiple couplers. One side of the main structure is connected to the base, and the main structure includes a hollow tube disposed inside the main structure. The multiple main reinforcing bars pass through the main structure, one end of each of which is connected to the corresponding one of the multiple couplers. The concrete structure covers the base, the main structure and the multiple main reinforcing bars.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1A:
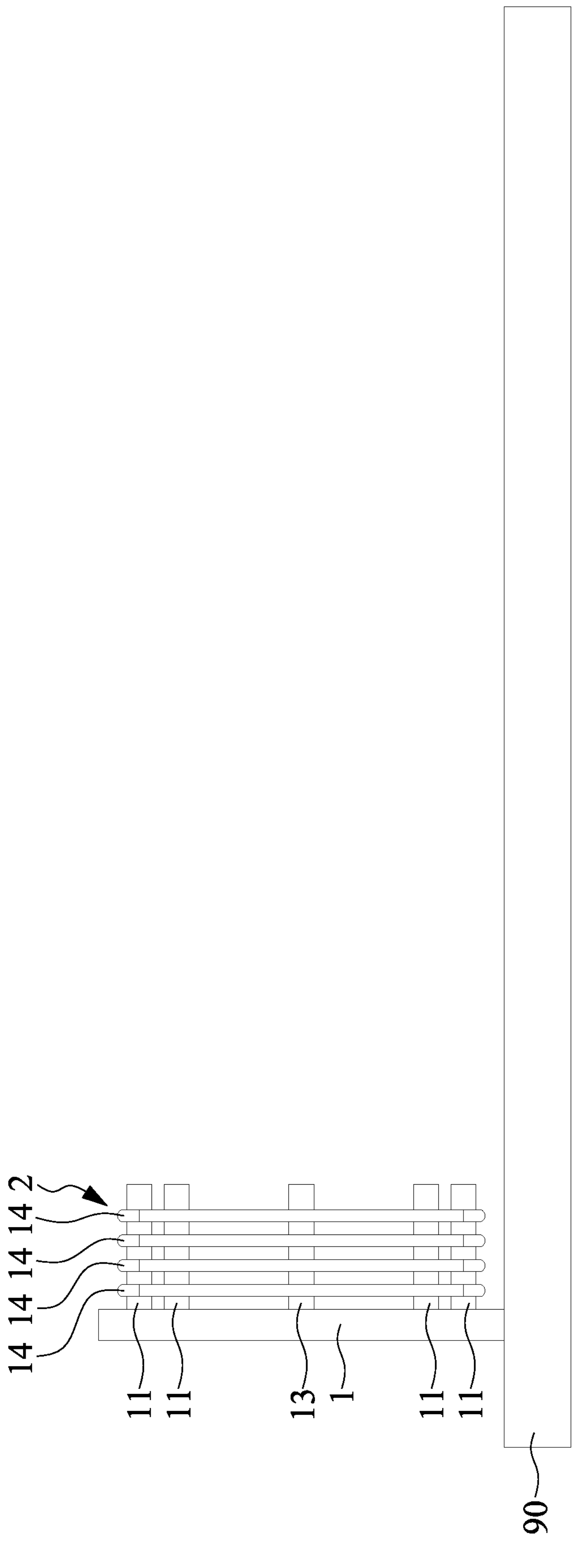
FIG. 1A is a schematic view showing a manufacturing process of a precast column, in accordance with one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In some embodiments, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass orientations of the device in use or operation in some embodiments different from the orientation depicted in the figures. The apparatus may be otherwise oriented (rotated 90 degrees or at other orientations) and the spatially relative descriptors used herein may likewise be interpreted accordingly.

The following describes an assembly method for a precast column of a construction structure in accordance with an embodiment of the present disclosure. FIG. 1A is a schematic view showing a manufacturing process of a precast column, in accordance with one embodiment of the present disclosure. Referring to FIG. 1A, the manufacturing process/method includes the following steps: providing a bottom plate 90, a bottom mold 1 and a base 2, wherein the bottom plate 90 is disposed on a surface, such as a ground surface on a construction site of a precasting factory, the bottom mold 1 is erected on and affixed to the bottom plate 90, and the base 2 is disposed on the right side of the bottom mold 1 and extends in the right direction so that the base 2 is disposed above the bottom plate 90.

In this embodiment, the base 2 includes multiple couplers 11, 13 and multiple stirrups 14. The couplers 11, 13 are separately disposed at intervals, located on the right side of the bottom mold 1 and extending along the right direction. The stirrups 14 are disposed to surround and be fixed to the multiple couplers 11, 13.

Figure 1B:
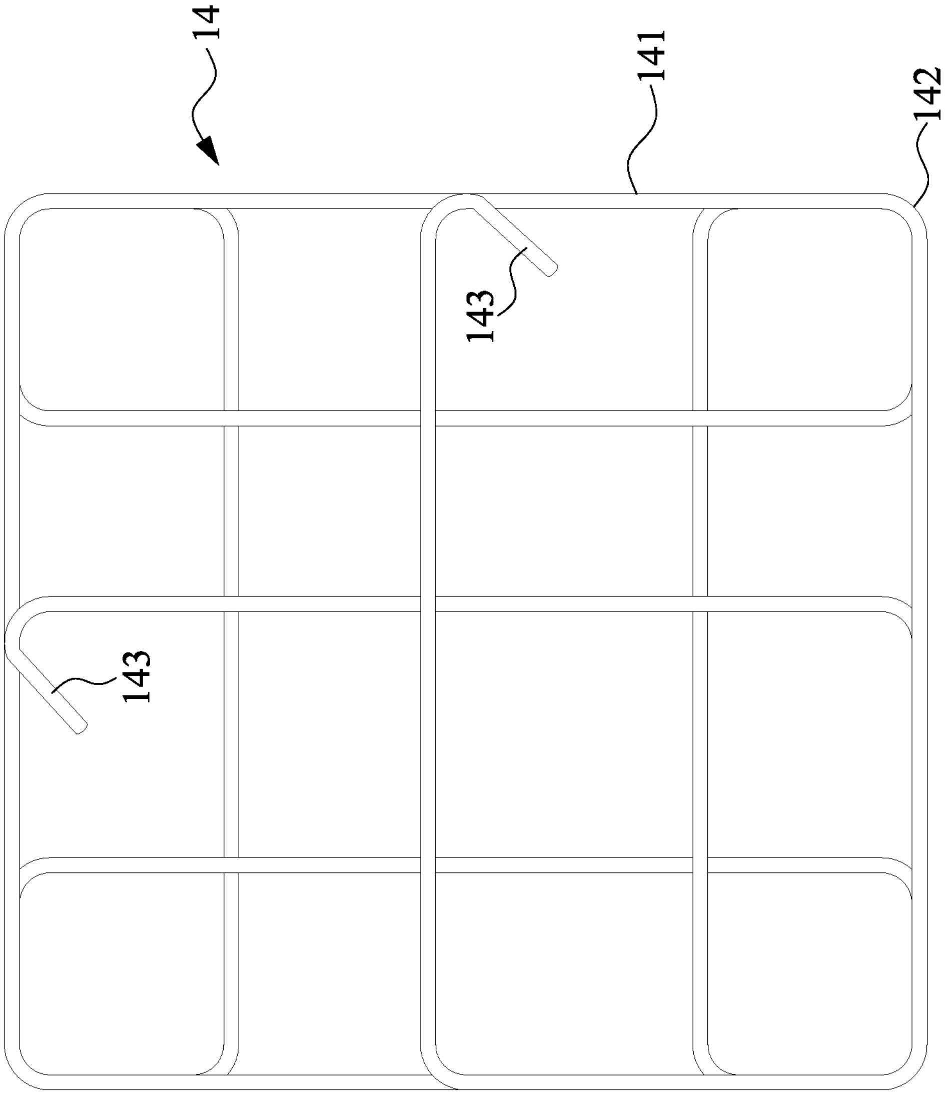
FIG. 1B is a schematic view of a stirrup adopted in the embodiment of the present disclosure.

FIG. 1B is a schematic view of a stirrup 14 adopted in the aforementioned embodiment of the present disclosure. Referring to FIG. 1B, the stirrup 14 is made of a single rebar and includes multiple straight sections 141 and multiple bending sections 142 connecting to the straight sections 141. The straight sections 141 and the bending sections 142 together form multiple rectangles, which surround the couplers 11, 13 as shown in FIG. 1A. The hooks 143 on two ends of the stirrup 14 are bent inward for anchoring to couplers 13. FIG. 4B is a right side view of FIG. 4A. Referring to FIG. 4B, the stirrup 14 surrounds multiple couplers 11, 13 and the hooks 143 of the stirrup 14 surround two couplers 13. In other embodiments, the stirrup 14 may be made of multiple reinforced bars (rebars) that are welded to each other.

Figure 2:
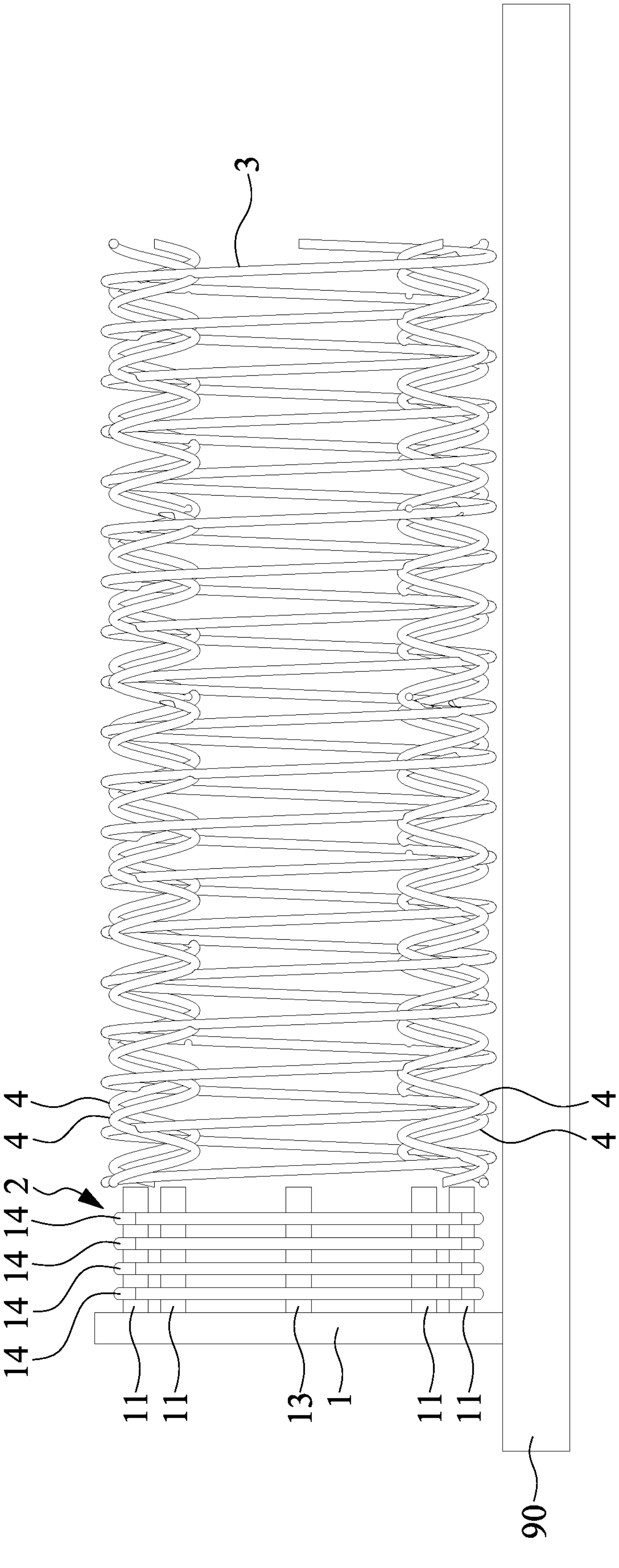
FIG. 2 is another schematic view showing the manufacturing process of the precast column, in accordance with the embodiment of the present disclosure.

FIG. 2 is another schematic view showing the manufacturing process of the precast column, in accordance with the embodiment of the present disclosure. In the present disclosure, a main spiral reinforcement and several ancillary spiral reinforcements are provided. FIG. 2 shows that one end of spiral reinforcement 3 and one end of each of the multiple ancillary spiral reinforcements 4 are connected to the base 2. The ancillary spiral reinforcements 4 are disposed around and partially overlap with the main spiral reinforcement 3. Referring to FIG. 4B, in this embodiment, the diameter of the main spiral reinforcement 3 substantially corresponds to the length/width of one side of the base 2. In this embodiment, four sets of ancillary spiral reinforcements 4 are provided and correspond to four couplers 11 on the four corners of the base 2. As shown in FIG. 4B, four couplers 13 are disposed on the middles of the left and right sides of the base 2, and four other couplers 13 are disposed on the middles of the upper and lower sides of the base 2. The eight couplers 13 are separated from the four sets of the ancillary spiral reinforcement 4. In some embodiments of the disclosure, temporary supports (not shown) are used to temporarily support the main spiral reinforcement 3 and the multiple ancillary spiral reinforcements 4 to secure their predetermined positions.

Figure 3:
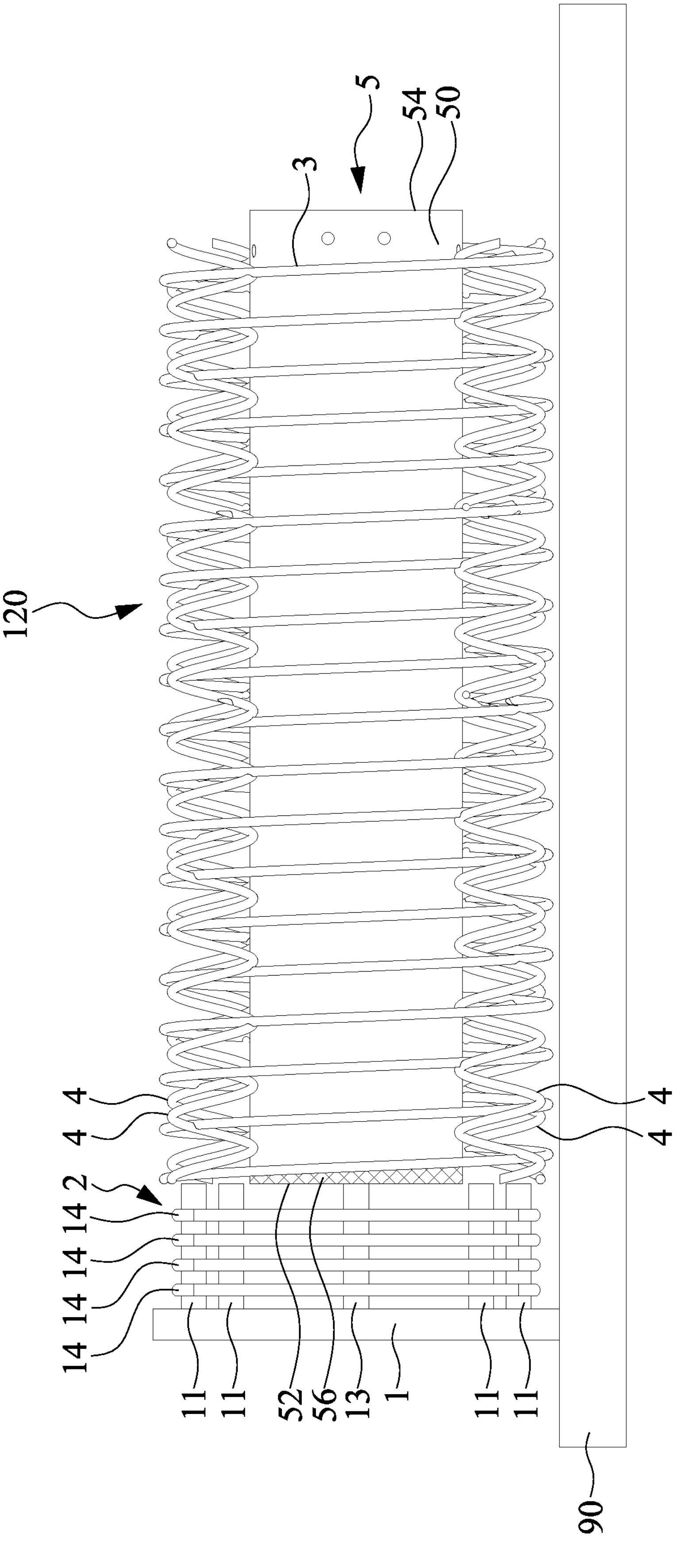
FIG. 3 is a further schematic view showing the manufacturing process of the precast column, in accordance with the embodiment of the present disclosure.

FIG. 3 is a further schematic view showing the manufacturing process of the precast column, in accordance with the embodiment of the present disclosure. As shown in FIG. 3, a hollow tube 5 is provided and is disposed inside the main spiral reinforcement 3. One end of the hollow tube 5 is connected to the base 2, and the two ends of the hollow tube 5 substantially align with those of the main spiral reinforcement 3 and those of the multiple ancillary spiral reinforcements 4 so that the hollow tube 5, the main spiral reinforcement 3 and the multiple ancillary spiral reinforcements 4 together form a main structure 120. In this embodiment, the hollow tube 5 includes a tubular body 50 and a stopper 56. The tubular body 50 has a first opening 52 and a second opening 54 opposite the first opening 52. The first opening 52 faces the base 2; the second opening 54 is exposed. The stopper 56 covers the first opening 52 of the base 2 adjacent to the tubular body 50. The stopper 56 may be an expanding mesh, and the material of the expanding mesh can be metal, such as stainless steel. The expanding mesh may have multiple pores, which are configured and sized so that concrete or mortar is prevented from penetrating into the tubular body 50.

Figure 4A:
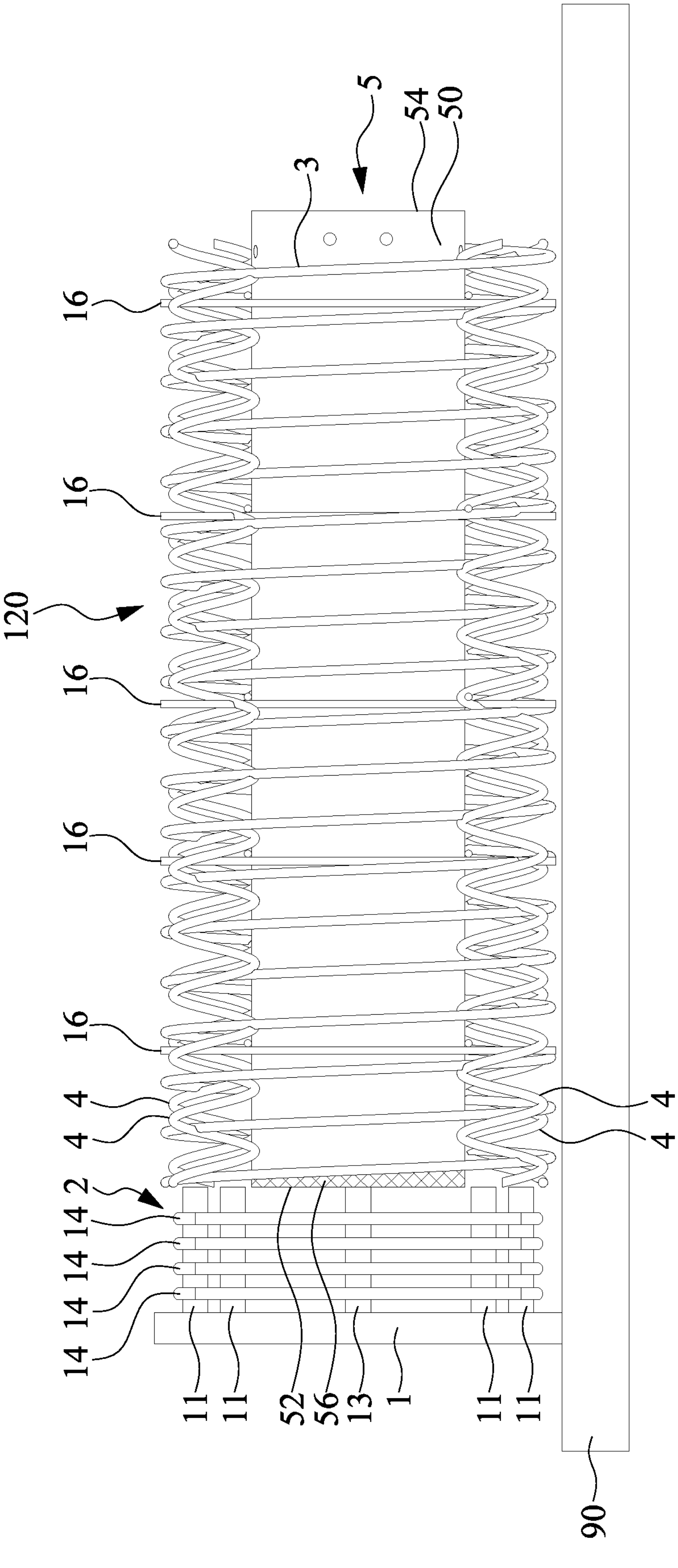
FIG. 4A is a still further schematic view showing the manufacturing process of the precast column, in accordance with the embodiment of the present disclosure.
Figure 4B:
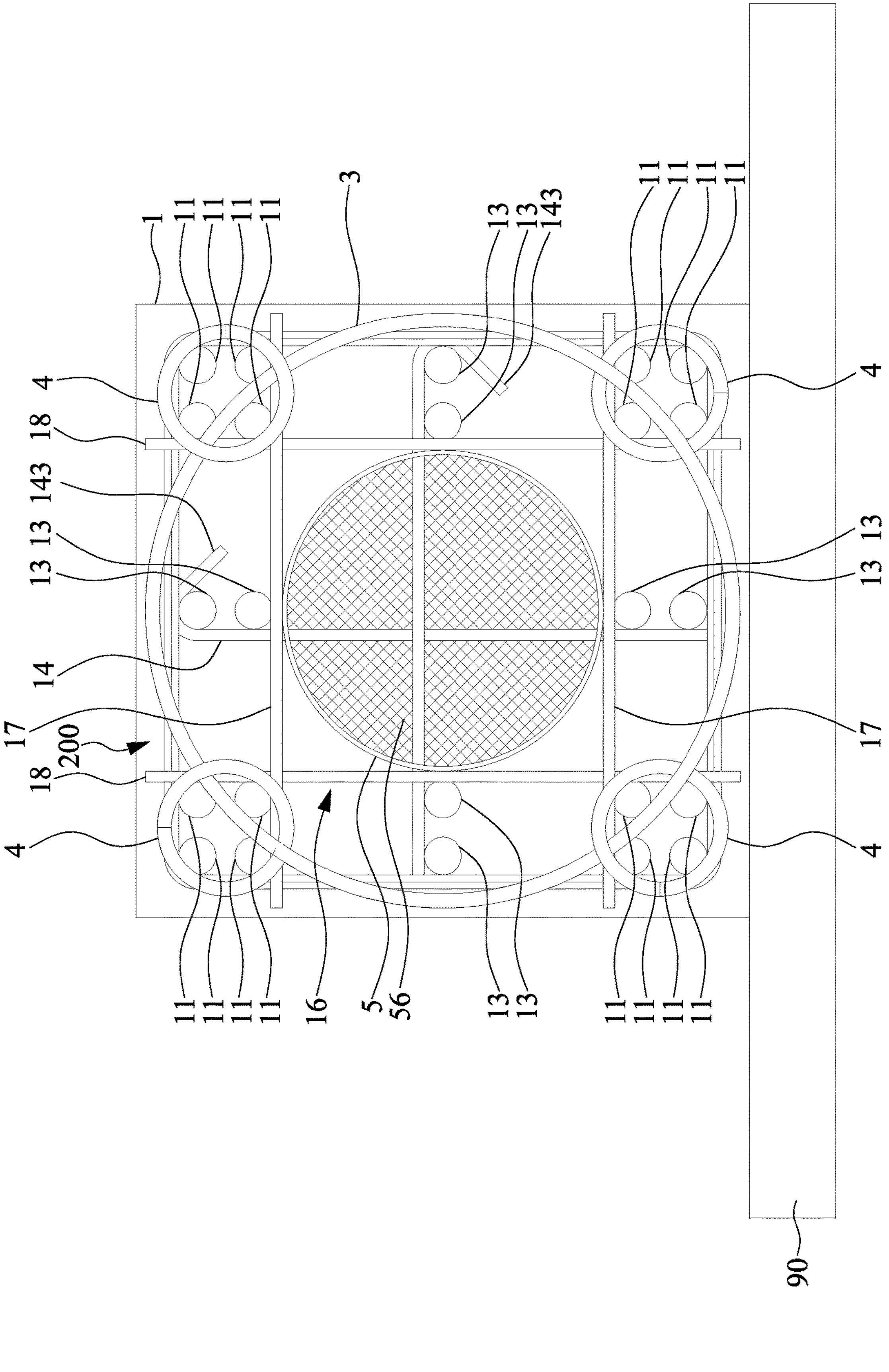
FIG. 4B is a right side view of FIG. 4A.

FIG. 4A is a still further schematic view showing the manufacturing process of the precast column, in accordance with the embodiment of the present disclosure. Referring to FIG. 4A, after the step of providing the hollow tube 5 as illustrated in FIG. 3, the method in this embodiment further includes disposing multiple positioning device 16 at intervals on the outer side of the hollow tube 5 for securing the position of the hollow tube 5.

FIG. 4B is a right side view of FIG. 4A. In this embodiment, each of the multiple positioning device 16 includes four bars 17, 18. The aforementioned step of disposing the multiple positioning device 16 at intervals on the outer side of the hollow tube 5 includes disposing the four bars 17, 18 against the outer sides of the hollow tube 5 so that the four bars 17, 18 are in a pound-symbol-shape. The four bars 17, 18 are connected to the main spiral reinforcement 3 and the multiple ancillary spiral reinforcements 4 and abut against the four sides of the hollow tube 5 so as to firmly secure the position of the hollow tube 5.

Figure 5A:
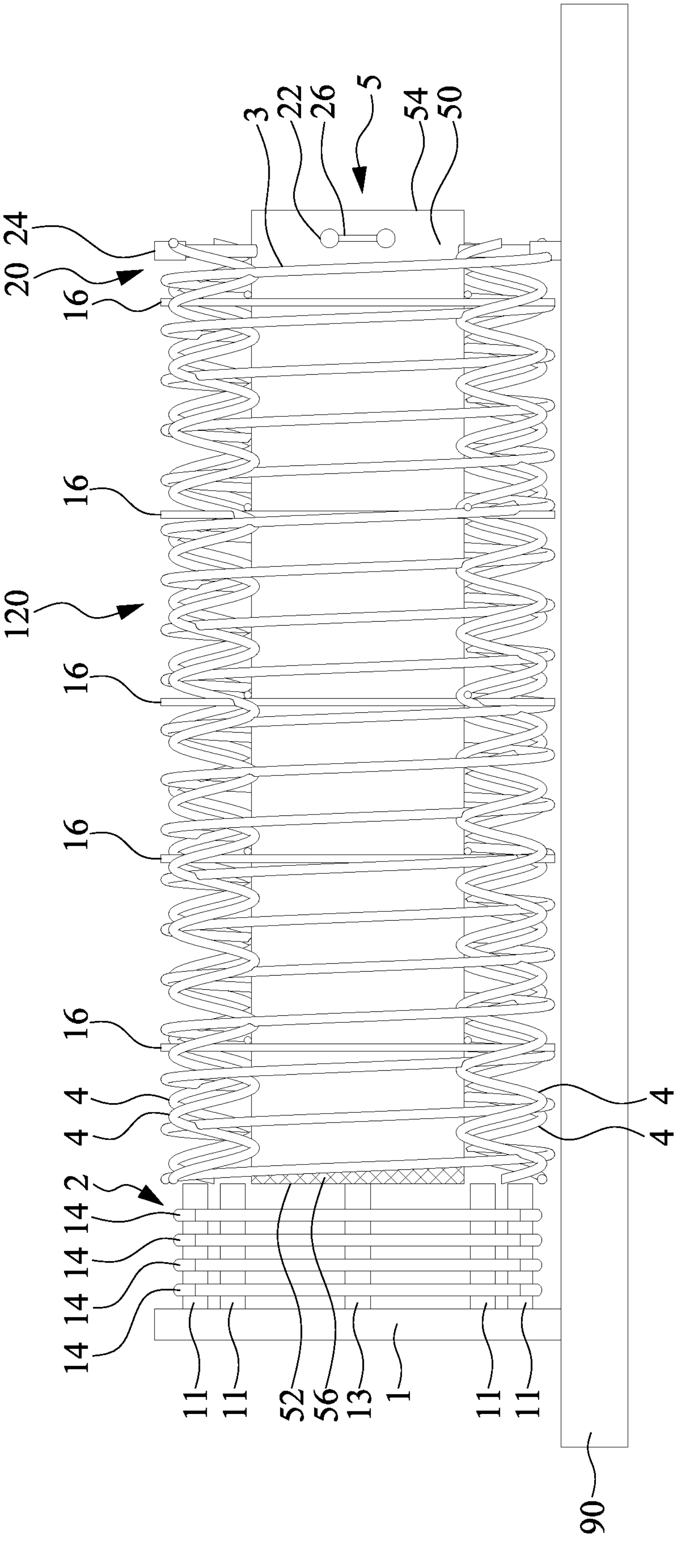
FIG. 5A is a still further schematic view showing the manufacturing process of the precast column, in accordance with the embodiment of the present disclosure.

FIG. 5A is a still further schematic view showing the manufacturing process of the precast column, in accordance with the embodiment of the present disclosure. As shown in FIG. 5A, the method in this embodiment further includes providing a pre-embedded device 20 disposed on the side of the main structure 120 that is farther away from the base 2. The pre-embedded device 20 is connected to the main spiral reinforcement 3 of the main structure 120, for enhancing the stiffness of the main structure 120.

Figure 5B:
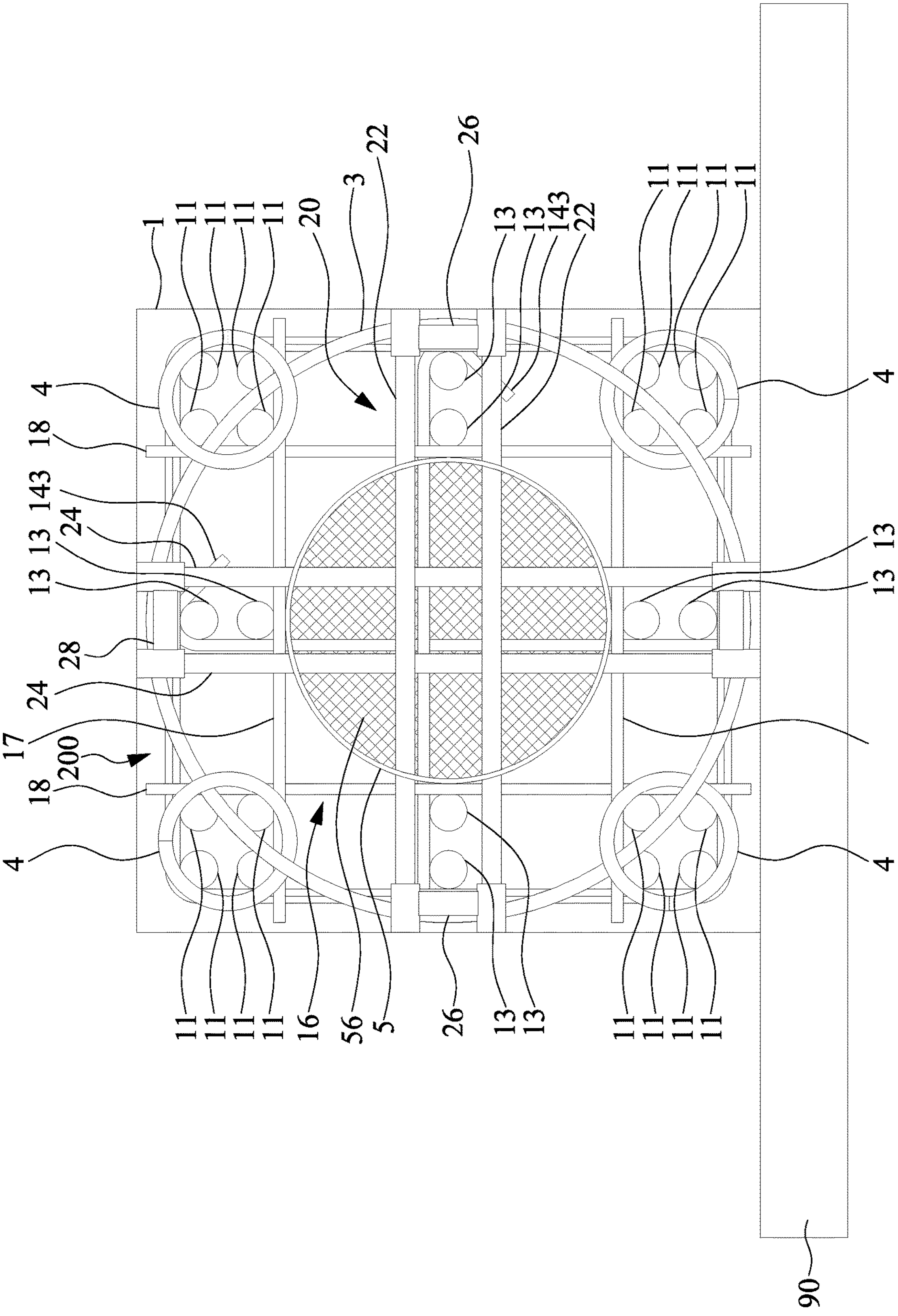
FIG. 5B is a right side view of FIG. 5A.

FIG. 5B is a right side view of 5A. As shown in FIG. 5B, the pre-embedded device 20 may include a first pair of rods 22 that are parallel to each other and a second pair of rods 24 that are parallel to each other. The first pair of rods 22 and the second pair of rods 24 are intersected with each other in a criss-cross shape. The first pair of rods 22 and the second pair of rods 24 are affixed to each other by fastening components 26, 28 and connected to the main spiral reinforcement 3 of the main structure 120 for enhancing the stiffness of the main structure 120.

Figure 6:
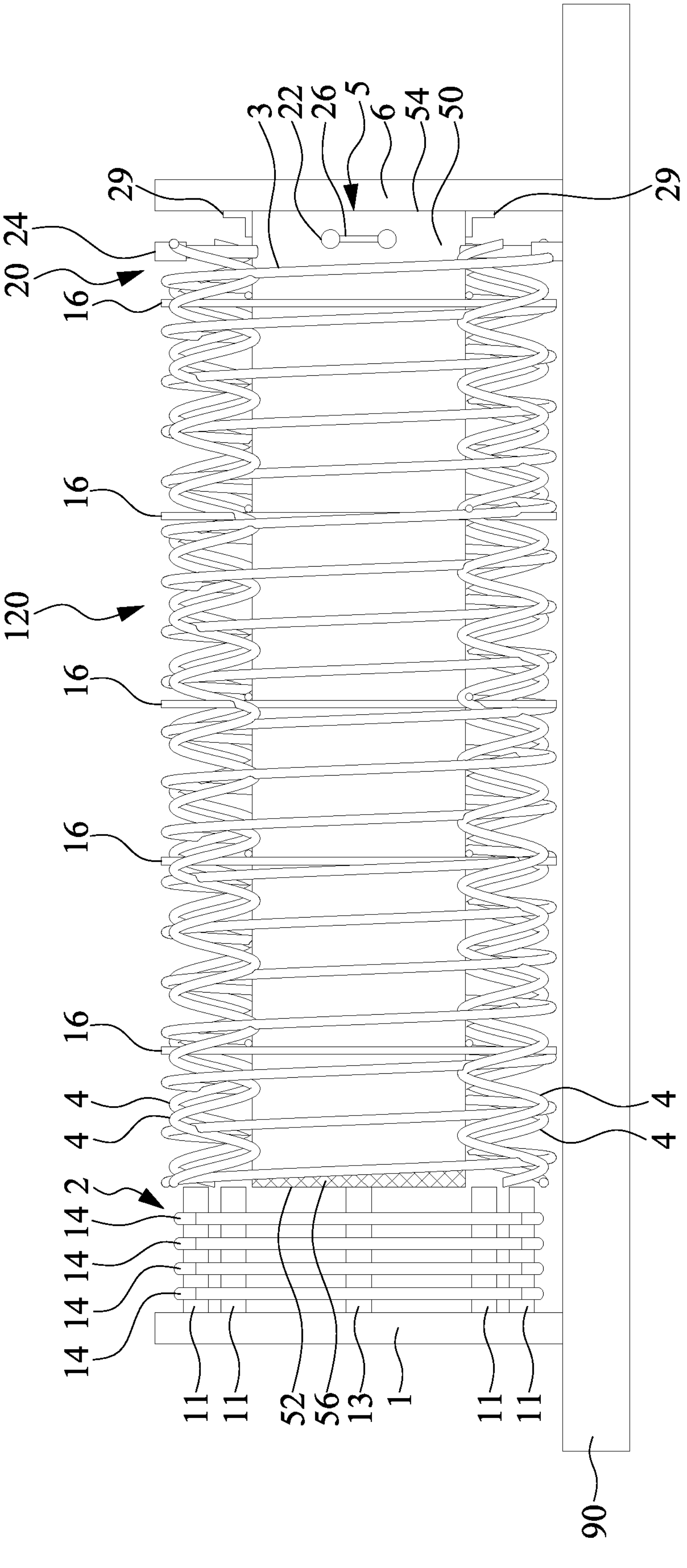
FIG. 6 is a still further schematic view showing the manufacturing process of the precast column, in accordance with the embodiment of the present disclosure.

FIG. 6 is a still further schematic view showing the manufacturing process of the precast column, in accordance with the embodiment of the present disclosure. As shown in FIG. 6, a top mold 6 is disposed on the side of the main structure 120 that is opposite to the base 2. The step of providing the top mold 6 may further include providing multiple fixation components 29 for fixing the hollow tube 5 to the top mold 6. In this embodiment, each of the fixation components is an L-shaped plate, one end of which is affixed to the hollow tube 5, and the other end of which is affixed to an inner side of the top mold 6.

Figure 7A:
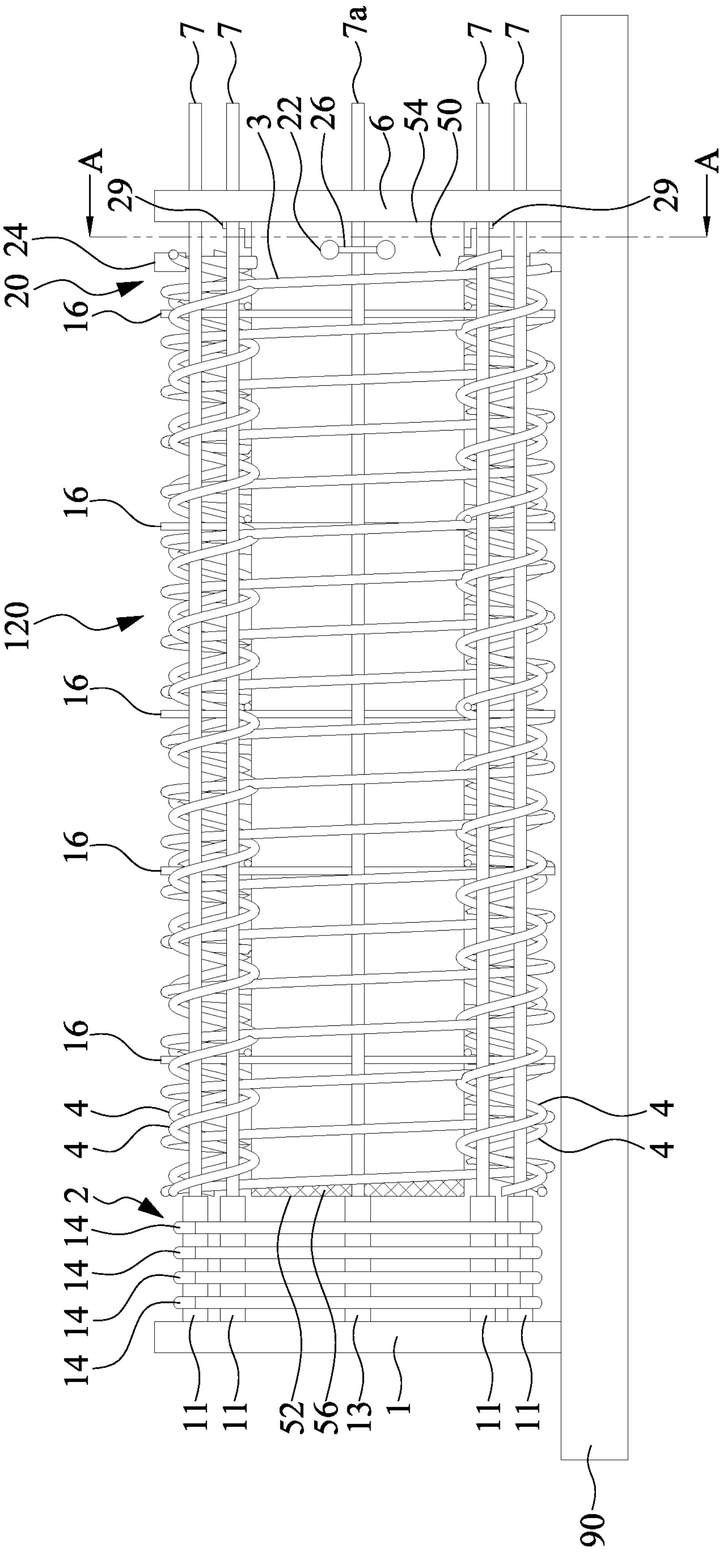
FIG. 7A is a still further schematic view showing the manufacturing process of the precast column, in accordance with the embodiment of the present disclosure.
Figure 7B:
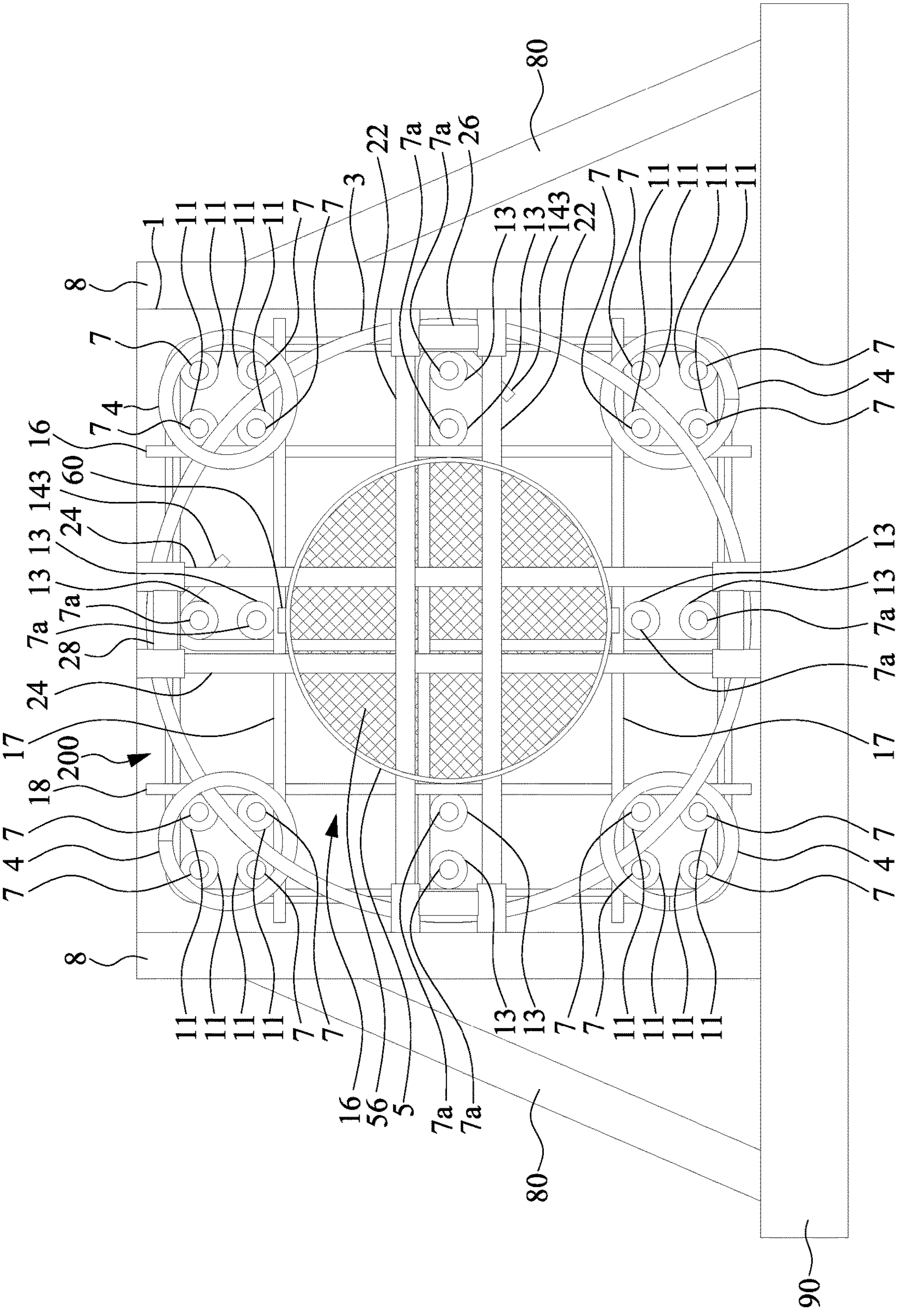
FIG. 7B is a cross-sectional view of FIG. 7A along line A-A.

FIG. 7A is a still further schematic view showing the manufacturing process of the precast column, in accordance with the embodiment of the present disclosure; FIG. 7B is a cross-sectional view of FIG. 7A along line A-A. As shown in FIGS. 7A and 7B, multiple main reinforcing bars 7, 7*a* are provided and are penetrated through the main structure 120 so that one end of each of the main reinforcing bars 7, 7*a* is connected to the corresponding couplers 11, 13. The main reinforcing bar 7 is connected to the coupler 11; the main reinforcing bar 7*a* is connected to the coupler 13.

FIG. 7B shows a pair of lateral molds 8 that are disposed on two opposing sides of the main structure 120 and the base 2, and two ends of each lateral mold 8 are connected to the bottom mold 1 and the top mold 6. In some embodiments, multiple support legs 80 are provided. One end of each of the support legs 80 is disposed on the bottom plate 90, and the other end of each of the support legs abuts against the outer side of the lateral mold 8 to reinforce the support to the main structure 120 from the lateral molds 8.

Figure 8:
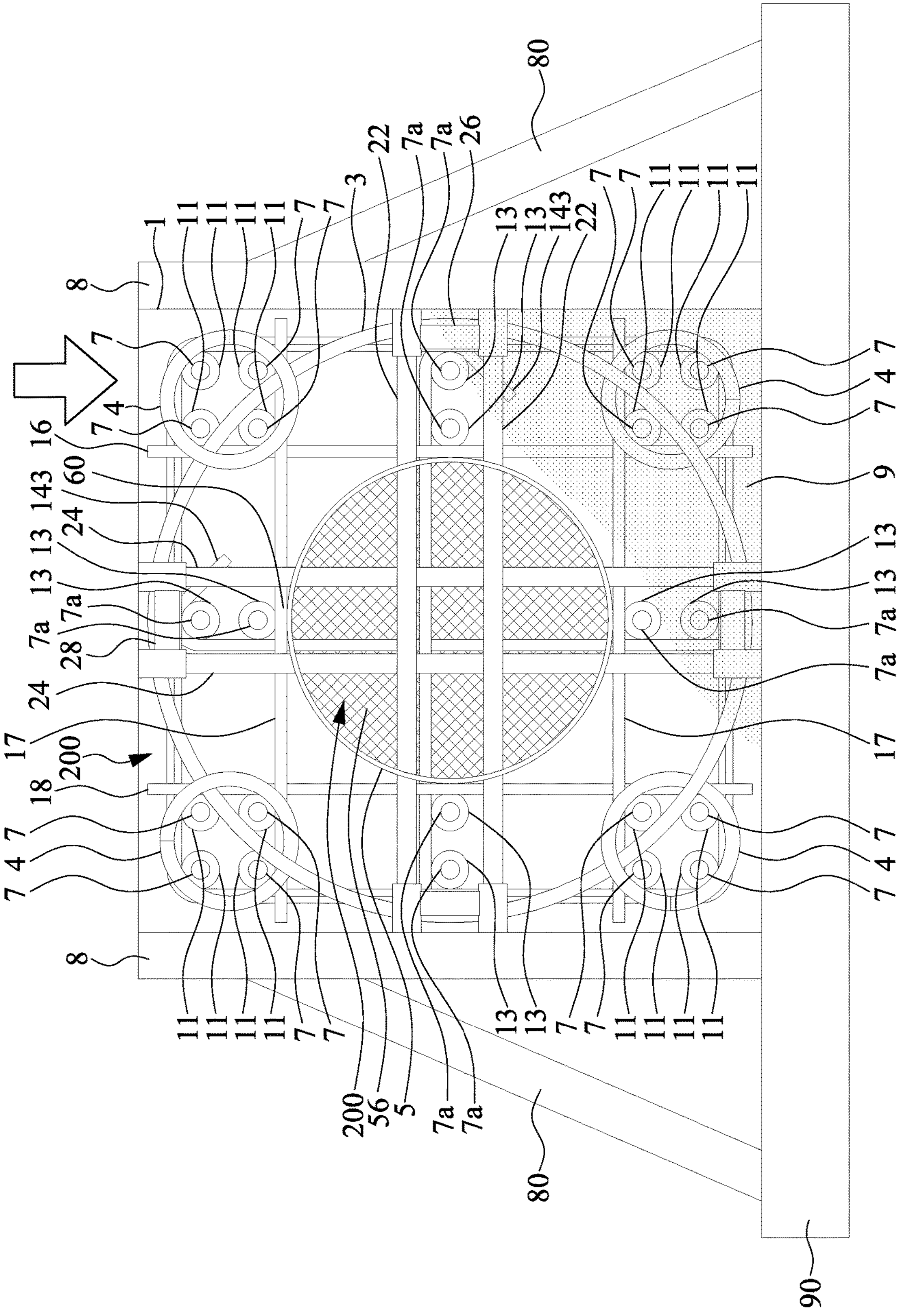
FIG. 8 is a still further schematic view showing the manufacturing process of the precast column, in accordance with the embodiment of the present disclosure.

FIG. 8 is a still further schematic view showing the manufacturing process of the precast column, in accordance with the embodiment of the present disclosure. As shown in FIG. 8, the method in this embodiment further includes pouring concrete 9 into the space 200 formed by the bottom mold 1, the top mold 6, the bottom plate 90, and the pair of the lateral molds 8. In some embodiments, the step of pouring the concrete 9 may further include pouring the concrete 9 towards and near one of the lateral molds 8. In this embodiment as shown in FIG. 8, the concrete 9 is poured towards the lateral mold 8 on the right side.

Figure 9:
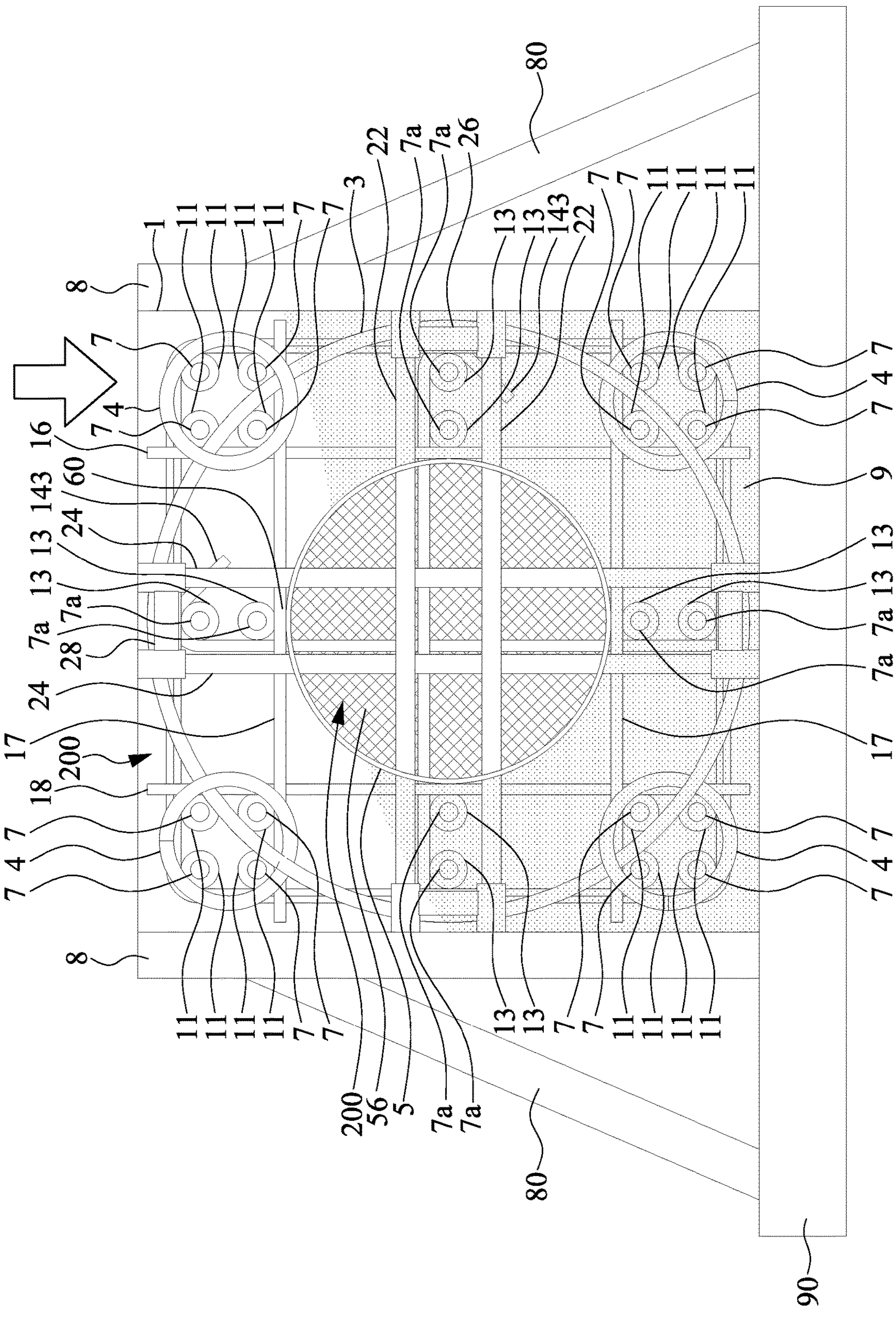
FIG. 9 is a still further schematic view showing the manufacturing process of the precast column, in accordance with the embodiment of the present disclosure.

FIG. 9 is a still further schematic view showing the manufacturing process of the precast column, in accordance with the embodiment of the present disclosure. After the step shown in FIG. 8, in FIG. 9, the concrete 9 is continuously poured and surrounds the outer side of the hollow tube 5. In this embodiment, the concrete 9 is poured from the right side (one side), effectively preventing air from staying under the hollow tube 5. In other embodiments, the concrete 9 may be poured towards the left side, and can also prevent the air from staying under the hollow tube 5.

Figure 10:
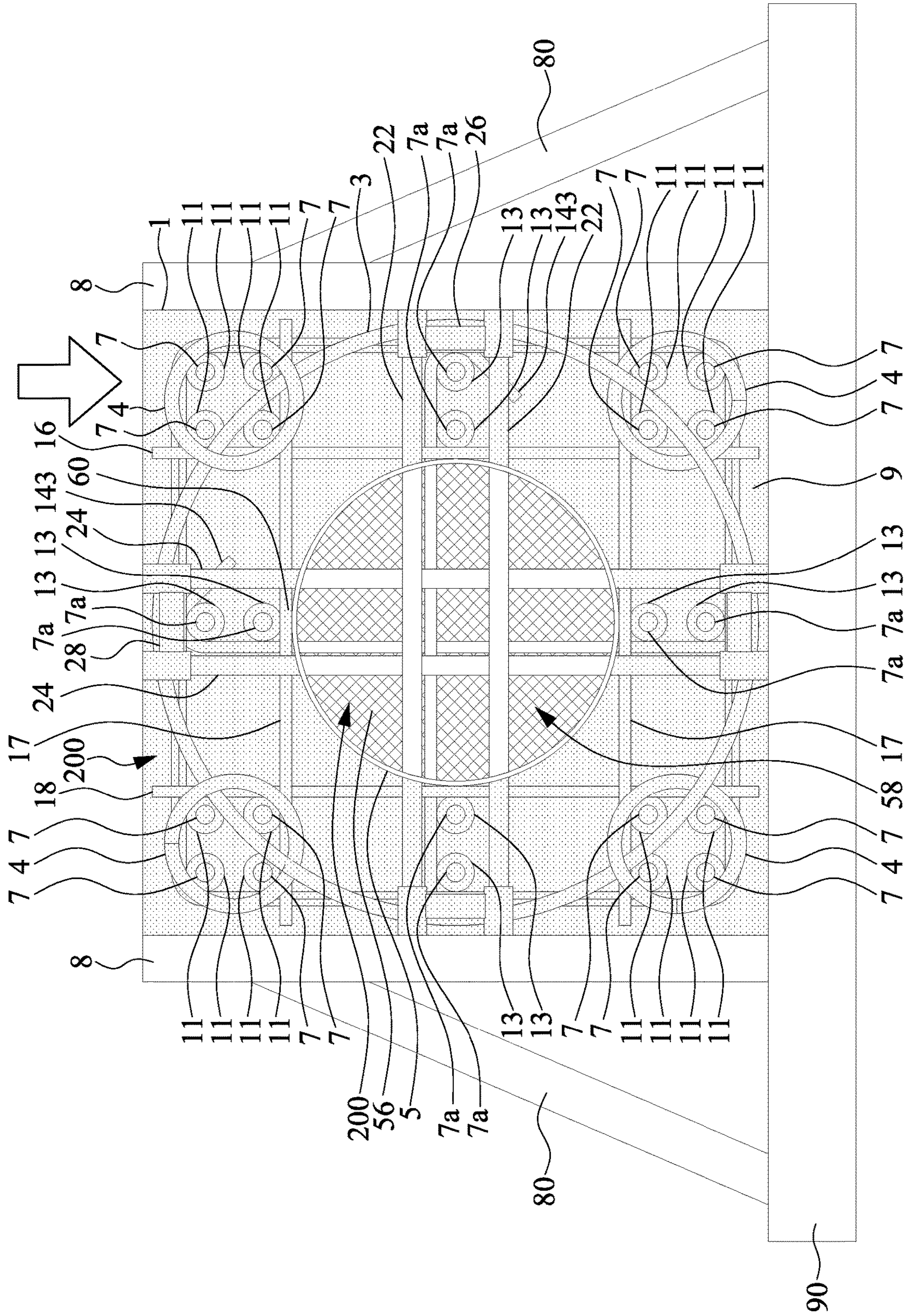
FIG. 10 is a still further schematic view showing the manufacturing process of the precast column, in accordance with the embodiment of the present disclosure.

FIG. 10 is a still further schematic view showing the manufacturing process of the precast column, in accordance with the embodiment of the present disclosure. In FIG. 10, the space 200 between the two lateral molds 8 is filled with the concrete 9. Then, the concrete 9 is left to stand for a period of time. As shown in FIG. 10, the hollow tube 5 prevents the concrete 9 from being poured into the space 200 inside the hollow tube 5, and a long tubular chamber 58 is formed inside the hollow tube 5.

Figure 11A:
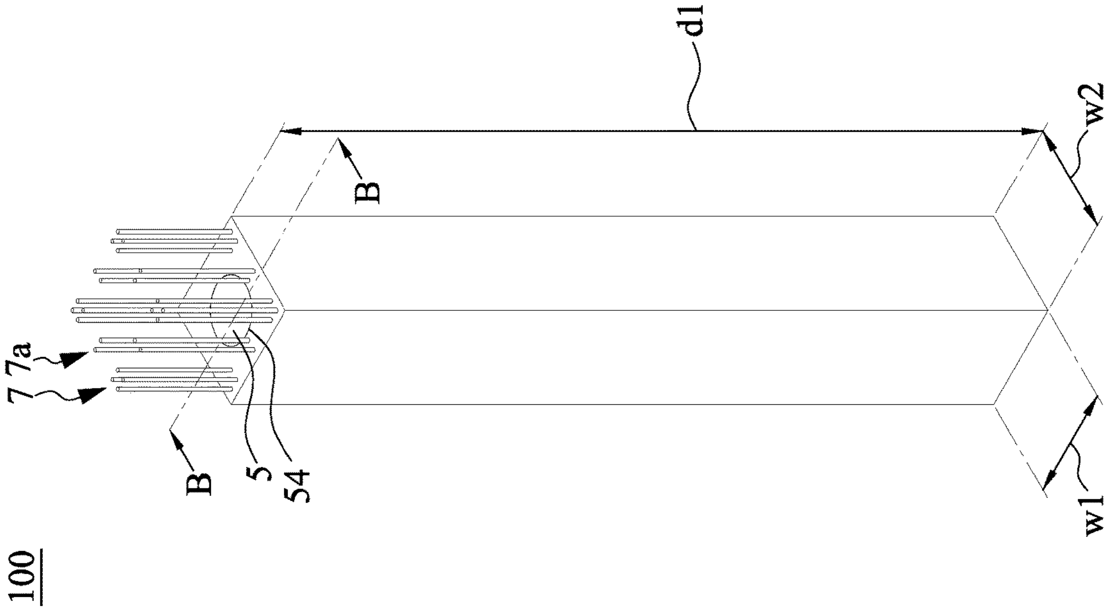
FIG. 11A is a schematic view of the precast column made according to the manufacturing process, in accordance with the embodiment of the present disclosure.

FIG. 11A is a schematic view of the precast column made in accordance with some embodiments of the present disclosure. After the aforementioned steps, as shown in FIG. 11A, the bottom plate 90, the bottom mold 1, the lateral molds 8 and the top mold 6 shown in the aforementioned figures are removed, and the precast column 100 is solidified and erected. As clearly shown in FIG. 11A, the second opening 54 of the hollow tube 5 that is farther away from the base 2 is exposed. For a precast column 100 of the same size that is not hollow, the weight may be about 32 tons. In this embodiment, the weight of the precast column 100 manufactured by the aforementioned method may be reduced to 25 tons (about 22% lighter), and the strength of the precast column 100 can still meet the legal requirements. In one embodiment, the height d1 of the precast column 100 may be 9.2 meters, and the width w1 and the width w2 of the precast column 100 may both be 1.2 meters.

Figure 11B:
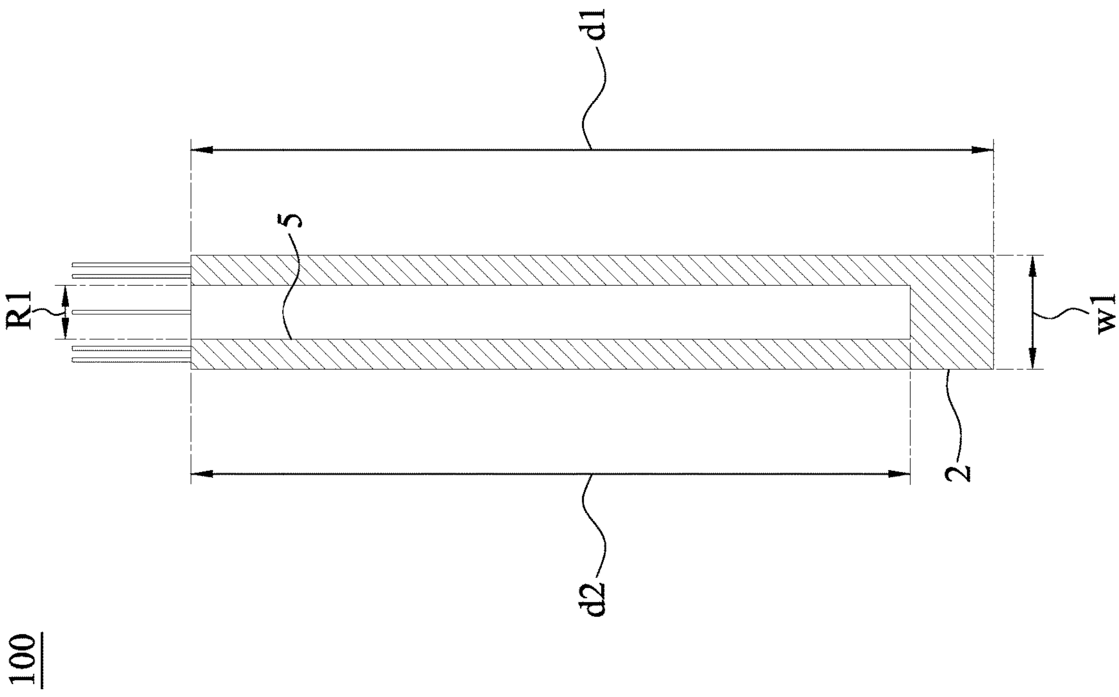
FIG. 11B is a cross-sectional view of FIG. 11A along line B-B.

FIG. 11B is a cross-sectional view of FIG. 11A along line B-B. In one embodiment, the length d2 of the hollow tube 5 is 8.7 meters. In one embodiment, the ratio of the length d2 of the hollow tube 5 to the length d1 of the precast column 100 is around 0.945 to 1. In one embodiment, the inner diameter R1 of the hollow tube 5 is 6.5 meters. In one embodiment, the ratio of the inner diameter R1 of the hollow tube 5 to the width w1 of the precast column 100 is around 13 to 24.

In sum, the present disclosure provides a precast column and a manufacturing method thereof. The precast column includes a hollow tube and an interior hollow, long and tubular chamber surrounded by a main spiral reinforcement. The precast column of the present disclosure has a reduced weight while maintaining its strength. The precast column of the present disclosure is easier for transportation, reducing the transport costs. In addition, the precast column of the present disclosure may reduce the material costs and the manufacturing costs.

The term "pre-casting concrete" in this disclosure refers to a concrete structure that can be manufactured in a factory, where concrete is poured into a reusable mold and solidified in a controlled environment, then transported to a construction site.

The term "semi-pre-casting concrete" in this disclosure refers to a concrete structure, a portion of which can be manufactured in a factory, where concrete is poured into a reusable mold and solidified in a controlled environment, and another portion of which is not precast, where concrete is poured on-site and connected to the aforementioned precast portion, such as precast columns, beams and floors.

Notwithstanding that the numerical ranges and parameters set forth in the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately," or "about" generally mean within a value or range which can be contemplated by people having ordinary skill in the art. Alternatively, the terms "substantially," "approximately," or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately," or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless otherwise specified.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, compositions of matter, means, methods and steps described in the specification. As one of ordinary skill in the art will readily appreciate from the disclosure of the present invention, processes, machines, manufacture, compositions of matter, means, methods or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A precast column, comprising:

a base, comprising:

a plurality of couplers disposed on a bottom mold segment; and a plurality of stirrups surrounding the plurality of couplers;

a main structure, one end of which is connected to the base, the main structure comprising a hollow tube disposed inside the main structure;

a plurality of main reinforcing bars passing through the main structure, one end of each of which is connected to the corresponding one of the plurality of couplers;

a concrete structure covering the base, the main structure and the plurality of main reinforcing bars; and a plurality of positioning components disposed at intervals on an outer side of the hollow tube, the plurality of positioning components comprising four bars disposed against the outer side of the hollow tube and connecting to the main spiral reinforcement and the plurality of ancillary spiral reinforcements in a pound-symbol-shaped configuration;

wherein the main structure further comprises a main spiral reinforcement and a plurality of ancillary spiral reinforcements disposed around the main spiral reinforcement and partially overlapping with the main spiral reinforcement, wherein the hollow tube is disposed inside the main spiral reinforcement.

2. The precast column of claim 1, further comprising:

a pre-embedded device disposed on one side of the main structure that is away from the base, the pre-embedded device comprising a first pair of rods and a second pair of rods, wherein the first pair of rods and the second pair of rods are intersected with each other in a criss-cross-shaped configuration, affixed to each other by a plurality of fastening components and connected to the main spiral reinforcement of the main structure for enhancing the stiffness of the main structure.

3. The precast column of claim 1, wherein the hollow tube comprises a tube body and a stopper covering an opening of the tube body that is adjacent to the base.

4. The precast column of claim 1, wherein an opening on a end of the hollow tube that is away from the base is exposed to the outside.

5. The precast column of claim 1, wherein the ratio of the diameter of the hollow tube to the width of the precast column is 13:24; and the ratio of the length of the hollow tube to the height of the precast column is 0.945:1.

6. The precast column of claim 1, wherein the two ends of the hollow tube are substantially aligned with those of the main spiral reinforcement and the ancillary spiral reinforcements.

7. The precast column of claim 1, wherein the concrete structure does not occupy the space in the hollow tube.

* * * * *